Figure 1:
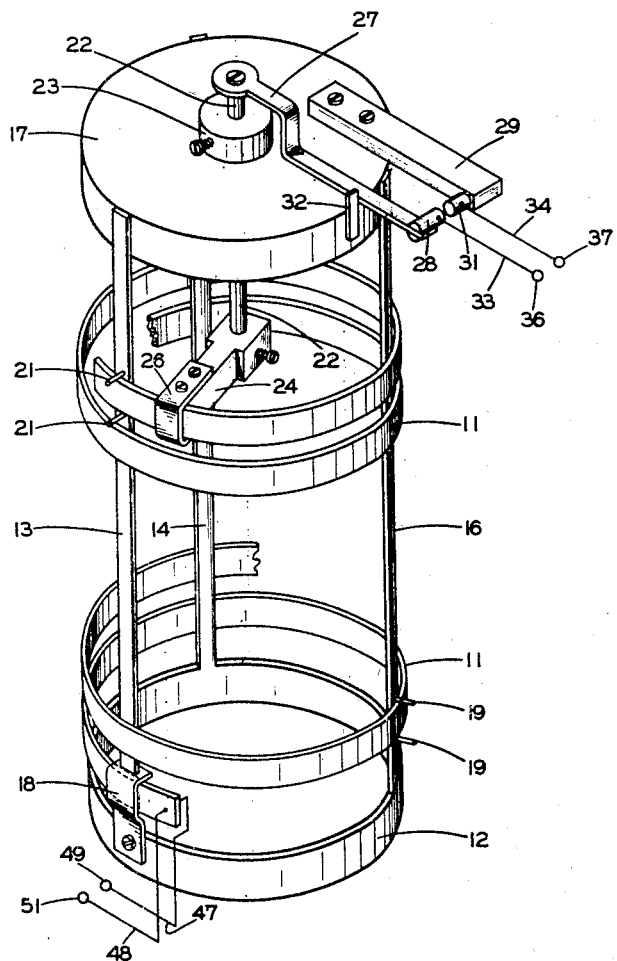

Feb. 14, 1950 A. L. W. WILLIAMS 2,497,108
ELECTROMECHANICAL TRANSDUCER
Filed June 12, 1948 2 Sheets-Sheet 1

INVENTOR.
ALFRED L. W. WILLIAMS
BY
Harrison A. Mumma Jr.
ATTORNEY

Feb. 14, 1950     A. L. W. WILLIAMS     2,497,108

ELECTROMECHANICAL TRANSDUCER

Filed June 12, 1948     2 Sheets-Sheet 2

*INVENTOR.*
ALFRED L. W. WILLIAMS
BY
*Harries A. Mumma Jr.*

ATTORNEY

Patented Feb. 14, 1950

2,497,108

UNITED STATES PATENT OFFICE 2,497,108

ELECTROMECHANICAL TRANSDUCER

Alfred L. W. Williams, Cleveland Heights, Ohio, assignor to The Brush Development Company, Cleveland, Ohio, a corporation of Ohio Application June 12, 1948, Serial No. 32,594

14 Claims. (Cl. 171—327)

This invention relates to electro-mechanical transducers, and more particularly to such transducers comprising elements of electro-mechanically sensitive dielectric material.

Numerous types of elements of electro-mechanically sensitive dielectric material affording usefully high electro-mechanical response are known. Such elements may be cut in the form of plates or bars from single crystals of piezoelectric substances. Depending on the substance, on the crystallographic orientation of the plate or bar, and on the arrangement of electrodes applied thereto, the electro-mechanical transducing may involve any of several modes of mechanical motion of the element, such as thickness or lengthwise expansion, face or thickness shear, or flexural motion. Two expander bars may be electroded and electroded surfaces thereof cemented together in a known manner to form a bending-sensitive element in which one bar expands while the other contracts. In a similar manner two face-shear plates may be affixed to each other to form a twisting-sensitive element.

Piezoelectric elements of the above-mentioned types have proved to be useful in many frequency-selective and transducing applications, but the shapes and sizes of the elements are limited by the desired crystallographic orientation and by the dimensions of suitable single crystals which are found as minerals or which may be synthesized by practical methods. The electro-mechanical response of a transducer element in turn is limited by several factors, an important factor being the maximum dimensions in which the element is obtainable commercially. For example, if considerable electrical energy is available at a given voltage, it may be desired to transduce this energy to mechanical energy so as to obtain a large mechanical displacement. However, regardless of which of the above-mentioned types of piezoelectric element is used, the mechanical response in terms of meters of displacement per unit applied voltage is determined and limited by one of the dimensions of the element, for example the length dimension of a lengthwise expander bar. Certain cuts from a few types of synthetic single crystals may be made quite long, but the expense involved, the awkward size of the element, and the difficulty of mounting it to protect it from breakage make impractical the use of such an element in a transducer. Various mechanical lever systems are known for attachment to elements of the above-mentioned types in order to obtain or to utilize a specific mechanical motion in association with a crystal element having a different motion. Nevertheless, considerations such as available power, impedance matching, and mechanical clearances restrict the mechanical transformations obtainable with lever systems.

There have been made available recently polycrystalline electro-mechanically-sensitive dielectric materials, which exhibit to a notable degree the property of developing substantial mechanical strains when subjected to an electrical field. The use of such materials, notably barium titanate bodies, which may be formed using ceramic techniques, has made it possible to produce transducer elements the size and shape of which are not limited by the dimensions of single crystals. Suitably polarized elements of polycrystalline titanate material are disclosed and claimed in the copending application Ser. No. 740,460, filed April 9, 1947, in the name of Hans Jaffe and assigned to the same assignee as the present invention. Bending-sensitive elements utilizing a plurality of mutually affixed electroded titanate plates are disclosed and claimed in the copending application Ser. No. 740,461, filed April 9, 1947, in the name of Hans Jaffe and assigned to the same assignee as the present invention, this copending application having issued on October 18, 1949, as Patent No. 2,484,950. Transducers including titanate bender elements of non-linear cross-sectional shape and of elongated hollow or tubular shape are disclosed and claimed in copending applications Ser. Nos. 32,587 and 32,593, respectively, filed June 12, 1948, in the names of Charles K. Gravley and Alfred L. W. Williams, respectively, and assigned to the same assignee as the present invention. While polycrystalline elements of these types may be used advantageously in electro-mechanical transducers and may be made to a rather large scale, the maximum dimensions and hence the electro-mechanical response of a transducer utilizing a polycrystalline element again are limited by considerations such as awkwardness of shape and protection against breakage of a very long element.

Accordingly, it is an object of the invention to provide a new and improved electro-mechanical transducer affording high electro-mechanical response and free from the above-mentioned limitations and disadvantages of prior transducers.

It is another object of the invention to provide a new and improved electro-mechanical transducer of convenient size and shape for obtaining a high mechanical response from a given source of electrical energy.

It is a further object of the invention to provide a new and improved electro-mechanical transducer utilizing an electro-mechanically sensitive element of polycrystalline dielectric material.

It is a still further object of the invention to provide a voltage-operated relay comprising an electro-mechanical transducer affording a high mechanical response to electrical excitation.

In accordance with the invention, an electro-mechanical transducer comprises an elongated element of electro-mechanically sensitive dielectric material convoluted into a space the largest dimension of which is a small fraction of the length measured along the elongated element to provide an electro-mechanical response significantly greater than that of an element of the same material and cross-sectional shape having a length equal to the largest dimension of the space containing the convoluted element but having a straight configuration.

For a better understanding of the present invention, together with other and further objects thereof, reference is had to the following description taken in connection with the accompanying drawings, and its scope will be pointed out in the appended claims.

Figure 3:
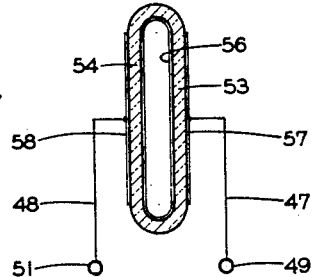
Figure 2:
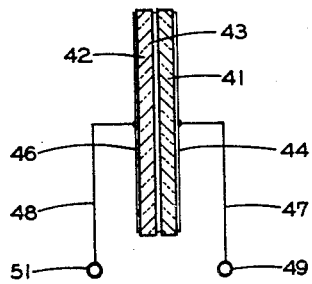
Figure 4:
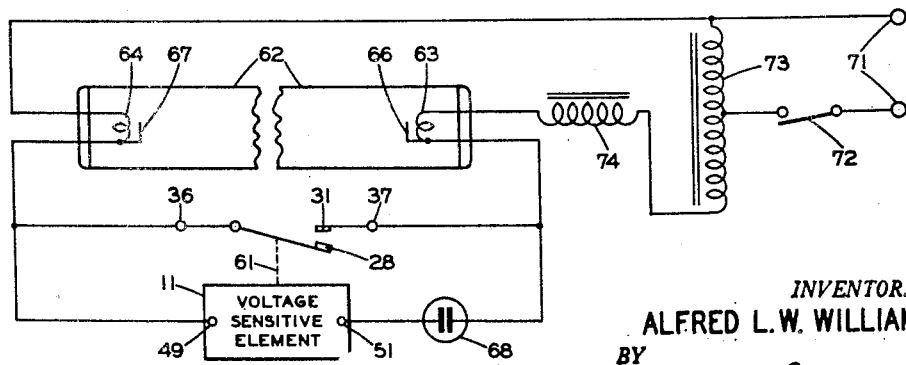
Figure 5:
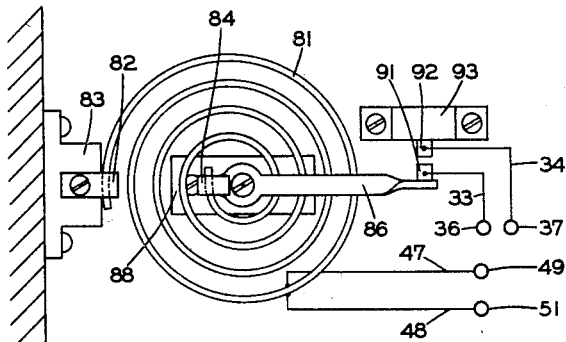
Figure 7:
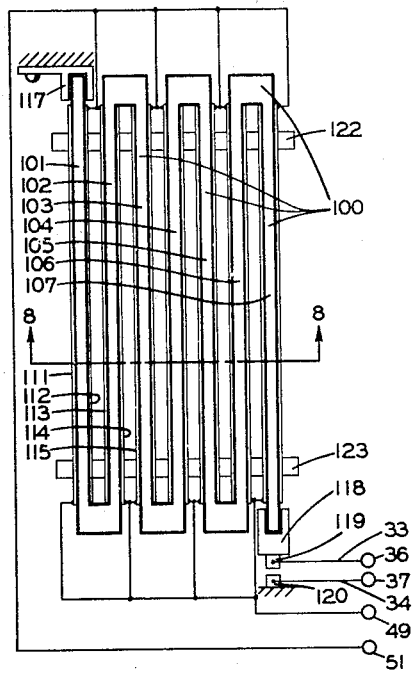
Figure 6:
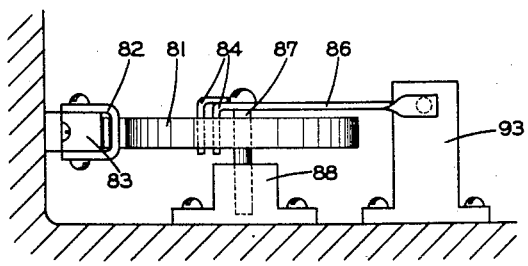
Figure 8:
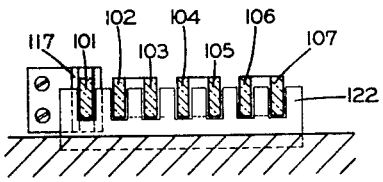

In the drawings, Fig. 1 is a perspective view of an electro-mechanical transducer in the form of a voltage-operated relay embodying the invention; Figs. 2 and 3 are enlarged cross-sectional views showing alternative structures of the electro-mechanically sensitive element included in the Fig. 1 arrangement; Fig. 4 is a schematic circuit diagram of a fluorescent lighting system including an electro-mechanical transducer of the type illustrated in Fig. 1; Figs. 5 and 6 are plan and elevation views respectively of another electro-mechanical transducer embodying the invention; and Figs. 7 and 8 are plan and sectional elevation views respectively of an additional embodiment of the invention, the sectional view of Fig. 8 being taken along the line indicated 8—8 in Fig. 7.

Referring now to Fig. 1, there is illustrated in perspective view a voltage-operated relay including an electro-mechanical transducer embodying the present invention. This transducer comprises an elongated element 11 of electro-mechanically sensitive dielectric material having a convoluted configuration. More particularly, the element 11 is coiled into a generally helical configuration occupying a generally cylindrical space having a radius equal to the radius of the individual turns of the helical element 11 and having an axial length equal to the axial length of the helix formed by the element. The helical element is shown in Fig. 1 with the central turns of the helix broken away to show details of construction. The exact number of turns is dependent upon particular design considerations such as available voltage, desired displacement of the relay contactor during operation, and the material and cross-sectional shape of the element. As illustrated in Fig. 1, the axial length of the cylindrical space occupied by the element is the largest dimension of this space. This largest dimension of the space into which the elongated element is convoluted is a small fraction of the length measured helically along the elongated element.

While some elongated electro-mechanically sensitive elements of the types illustrated in the drawings, and particularly in Figs. 7 and 8 as described hereinbelow, may be machined from a single crystal of a piezoelectric material, the convoluted shape of the elements makes the use of polycrystalline electro-mechanically sensitive dielectric materials more practical. As mentioned hereinabove, such polycrystalline materials, notably a material consisting primarily of barium titanate, may be formed by the use of ceramic techniques. The material is inexpensive, and these forming techniques may be much more economical than the necessarily more or less complicated machining operations. The polycrystalline materials have the added advantage that they may be polarized in the thickness direction throughout the length of a shape which is convoluted in the longitudinal direction.

To provide support for the helical element 11 and for the moving parts of the relay a framework is used, including a lower ring 12, three rods 13, 14, 16 equally spaced about the periphery of the cylindrical space the lower end of which is defined by the ring 12, and an upper disk 17 to the rim of which the three rods are fastened. During assembly the helical element 11 is slid over the rods 13, 14, and 16. As a means for mounting one end portion of the convoluted elongated element 11 there is provided a yoke 18. The upper end of the yoke 18 has a hole through which the rod 13 passes, while the lower end is screwed to the ring 12 after the inner surface of one end portion of the element 11 has been placed against the rod 13. Before the yoke 18 is screwed to the ring 12, shims may be placed between the yoke and the ring so that the yoke barely touches the outer surface of the element 11. A cement such as a polymerizing phenolic cement then is inserted between and around the element, the rod 13, and the yoke 18 to anchor the end of the element. To facilitate fitting the element around the rods 13, 14, and 16, the outer surfaces of the rods may be covered with a soft material, preferably felt or other fabric having a surface comprised of many filaments on top of which the element 11 rests. Pairs of pins such as the pins 19, 19 on the rod 16 near the mounted end of the element and the pins 21, 21 on the rod 13 near the free end of the element may be inserted in holes in the rods to serve as guides for the helical element.

Affixed to the other or upper end portion of the element 11 is a movable contactor arrangement. Since the desired motion of the free end of the element is substantially peripherally of the cylinder defined by the helical element, it is advantageous to convert this peripheral motion into a rotary motion of a suitable shaft 22. A central hole through the disk 17 serves as a bushing for the shaft 22, and the shaft is maintained in the bushing by a collar 23 screwed to the shaft above the disk 17 and by another collar, not visible in the drawing, screwed to the shaft below the disk. The lower end of the shaft 22 passes through a hole in an arm 24 which is adjustably tightened on the shaft. The arm 24 reaches radially outward as far as the radial distance to the outer surfaces of the rods 13, 14, and 16. A yoke 26 is passed over the outer surface of the upper end portion of the element 11 and is fastened with appropriate radial adjustment to the arm 24 by means of screws. A cement then is flowed between and around the element, the yoke 26, and the end of the arm 24. A contactor arm 27 of electrically nonconductive material is fixed to the upper end of the shaft 22 and extends radially outwardly of the disk 17. A contactor 28, movable with the arm 27, is affixed to the outer end of the arm 27. A bar 29 of electrically nonconductive material, adjustably attached by means of screws to the disk 17, carries on its outer end a normally fixed contactor 31 in a position opposed to the movable contactor 28. The contactor 28 is adapted to occupy two positions, one position when the transducer element 11 is supplied with an excitation voltage and another position when the transducer is electrically unexcited. Excessive motion of the arm 27 in the direction toward the unexcited position is prevented by a stop member 32 fastened to the rim of the disk 17. The fixed contactor 31 is adapted to be in electrical contact with the movable contactor 28 when the arm 27 carrying the movable contactor moves into and occupies the electrically excited position. Connected to the contactors 28 and 31 are respective lead wires 33 and 34 leading to the terminals 36 and 37 respectively.

Referring to Fig. 2, a cross-sectional view taken anywhere along the element 11 is shown. In the Fig. 2 embodiment the elongated element is a composite one made up of an inner longitudinally extending helical strip 41, which advantageously is of an electro-mechanically sensitive polycrystalline material, and an outer longitudinally extending helical strip 42, which may be of the same material. The strip 41 just fits inside the strip 42, and the strips are cemented together along the contiguous, longitudinally extending, electroded faces thereof, providing a central electrode 43. The strips 41 and 42 also have electrodes 44 and 46 respectively on the exposed major surfaces thereof. An element of this type may have the general structure disclosed and claimed in the aforementioned copending application Ser. No. 740,461 of Hans Jaffe. If a titanate material is used, a suitable polarizing or biasing voltage may be maintained continuously across the helical strips 41 and 42 in the manner described and claimed in the aforementioned copending application Ser. No. 740,460 of Hans Jaffe. With suitable titanate materials the continuous application of a biasing potential may be avoided in some cases by resorting to a prepolarizing treatment. For this treatment a temporary connection may be made to the central electrode 43 and a rather high polarizing potential applied between the electrode 43 and the electrodes 44 and 46, the latter two electrodes being interconnected temporarily for this purpose. For use after such prepolarization in the Fig. 1 apparatus, the temporary connections are broken and the inner and outer electrodes 44 and 46 respectively may be connected individually by means of respective lead wires 47 and 48 to terminals 49 and 51 respectively. The polarizing treatment described hereinabove polarizes the titanate material of the strips 41 and 42 in opposite directions, so that the application of an excitation voltage across the terminals 49 and 51 causes an excitation field in the direction of polarization of one of the strips 41, 42 and simultaneously in the direction opposite to the direction of polarization in the other of the strips.

An alternative cross-sectional shape for the element 11 of Fig. 1 is illustrated in Fig. 3. Here there is shown an elongated hollow element of generally elliptical cross-sectional shape. Forming the wider and flatter sides of this elliptical shape are two opposite walls 53 and 54 of the element, of which the wall 53 may be the inner wall of the helical element 11. The hollow element has a central or internal electrode 56 and two peripherally separated exposed electrodes 57 and 58 adjacent the exposed surfaces of the inner and outer walls 53 and 54 respectively and extending longitudinally of the element. Titanate transducer elements of this general shape are disclosed and claimed in the aforementioned copending application Ser. No. 32,593 of Alfred L. W. Williams. An element of a suitable titanate material and of the type illustrated in Fig. 3 may be prepolarized, for example in a direction from the central electrode 56 outward toward both outer electrodes, by interconnecting temporarily the outer electrodes 57 and 58 and applying a rather high polarizing potential between these interconnected electrodes and the central electrode 56. The polarizing connections then are removed and the exposed electrodes 57 and 58 connected to the lead wires 47 and 48 respectively, leading to the terminals 49 and 51 respectively, as with the Fig. 2 element. Application of an exciting potential across the terminals 49 and 51 then causes an exciting field in a direction outward of the hollow element across one of the sides 53, 54 thereof and in a direction inward of the hollow element across the other side thereof. The central electrode 56 assumes under these circumstances an intermediate potential. With either the Fig. 2 or Fig. 3 element, the exposed electrodes 44, 46 or 57, 58 may be scraped off or covered by insulating material where they pass under the yokes 18 and 26 near the ends of the element in the Fig. 1 arrangement to prevent short-circuiting of the electrodes and grounding to the supporting structure.

The schematic diagram of Fig. 4 illustrates an advantageous use of the voltage-operated relay of Fig. 1, and will be referred to in describing the operation of the Fig. 1 arrangement. The transducer element 11 is indicated in the diagram of Fig. 4 by a box identified as a voltage-sensitive element. The mechanical coupling through the arm 24, shaft 22, and arm 27 to the movable contactor 28 is represented by a dashed line 61, this mechanical coupling enabling motion of the movable contactor 28 relative to the fixed contactor 31. The relay terminals 36 and 37 and the excitation terminals 49 and 51 of the element 11 appear in the diagram of Fig. 4.

The relay is a part of a fluorescent lighting arrangement including a fluorescent lamp 62 having filaments 63, 64 at opposite ends thereof and anode electrodes 66, 67 associated with the respective filaments. One side of the filaments 63 is connected to the terminal 37 and, through a glow discharge tube 68, to the terminal 51. One side of the filament 64 is connected to the terminals 36 and 49. The fluorescent lighting system is supplied from an alternating current line 71, to which it may be connected by closing a line switch 72. More specifically, the line 71 may be connected through the line switch 72 to a voltage step-up autotransformer 73. A current-limiting inductor 74 is in circuit with the secondary terminals of the autotransformer 73. The transformer secondary and the inductor 74 are connected across the sides of the filaments 63 and 64 which are not connected to the relay as described hereinabove.

When the line switch 72 is closed, a voltage which is high relative to the voltage of line 71 is placed across the lamp 62. Since the lamp is not conducting and the filament circuit through the relay contacts is open, this voltage appears also across the glow tube 68 and the element 11, causing a glow discharge in the glow tube. After the initiation of the glow discharge most of the secondary voltage of the autotransformer 73 appears across the element 11. During the half cycle of the alternating-current wave which has the proper polarity an exciting field is impressed across the element 11 tending to make the inner portion 41 or 53 (Fig. 2 or Fig. 3) of the titanate element expand and the outer portion 42 or 54 contract. This involves in turn a lateral bending of each portion of the length of the coiled element with an associated increase in the radius of curvature along the entire length of the element. The element may be said to uncoil somewhat, and the uncoiling motion not only tends to increase the diameter of the helical element with an outward motion of the side of the helix opposite the rod 13 to which the bottom end of the helix is fixed, but also tends to cause a peripheral motion of the helix in a counterclockwise direction as viewed from the top of the helix. Since the bottom end of the helix is fixed and the helix is wound upwardly in a clockwise sense, this counterclockwise motion is needed to make up the increased periphery of each turn of the helix. The resulting peripheral motion of each turn is added to that of the next higher turn.

Thus the arm 24 imparts a considerable counterclockwise rotation to the shaft 22, causing the movable contactor 28 to come into contact with the fixed contactor 31 before the alternating voltage reaches its peak value in the half cycle under consideration. When the relay contacts close, a pulse of current commences to flow across the contacts and through the filaments 63 and 64 of the lamp 62. Although the closing of the relay contacts removes the excitation from the element 11 and causes the glow tube 68 to be extinguished, the resiliency of the contactor arm 27 and the mass of the movable contactor parts are chosen so that the contact is not broken immediately but remains closed for a substantial portion of the alternating current cycle. Hence appreciable heating of the filaments 63 and 64 occurs before a large number of cycles of the alternating current have passed. It is preferable that the fluorescent lamp 62 be of a type which may be ignited before its filaments have become very warm. Accordingly, during the last of a limited number of cycles of the alternating current the filaments become warm enough for operation of the lamp. When the relay contacts open during this cycle, the flow of current through the now warm filaments and the inductor 74 is interrupted. The interruption of this current causes a high voltage to be induced in the inductor 74, and the lamp 62 lights. The lamp current thereafter results in such a voltage drop across the inductor 74 that there is insufficient voltage across the glow tube 68 to ignite the tube, and the relay remains open as long as the lamp remains lit. Since there are no thermally operated elements in this fluorescent lighting arrangement other than the filaments 63 and 64 of the lamp itself, the period of starting of the lamp is limited primarily only by the desired extent of the heating of the filaments. For this reason lamp starters utilizing a voltage-operated relay operate more quickly than the conventional starter with a bimetallic element in the starter circuit.

The helical element 11, whether of the type illustrated in Fig. 2 or Fig. 3, is a bending-sensitive element by virtue of the simultaneous tendencies of one side of the element to contract and of the other side to expand. If the element were straightened out it would have a length practically equal to the circumference of the cylindrical space occupied by the helix multiplied by the number of turns of the helix, and this very long element, having a straight configuration and mounted or clamped at one end, would exhibit upon electrical excitation a bending throughout its length with corresponding lateral displacement of the free end. This displacement would be of the same order of magnitude as the displacement of the free end of the helical element 11 tending to move the arm 24 and rotate the shaft 22. However, an element of the extreme length of such a straight element would be entirely impractical for most applications. Since the largest dimension usually limits the use of a transducer, the performance of the helical element should be compared with the performance of an element of the same material and cross-sectional shape having a length equal to the largest dimension, that is the axial dimension, of the helix but having a straight configuration. The magnitude of the electro-mechanical response provided by the helical element then is significantly greater than the magnitude of the response of a straight element of the last-mentioned length, although the maximum dimension of the helical element is the same. More specifically, the mechanical response of the helical element, and hence of the movable contactor 28, for a given excitation voltage is significantly greater than that of a straight element of the same material and cross-sectional shape having a length equal to the axial length of the helix. While transducer structures including either convoluted or straight electro-mechanically sensitive elements may be designed to utilize mechanical resonances, the resonant frequencies and the electro-mechanical responses at resonance differ considerably for different designs, and the performance of convoluted and straight transducer elements is compared best at non-resonant frequencies, for example a very low frequency. It will be evident to those skilled in the art that an electro-mechanical transducer including a convoluted element such as the element 11 easily may be made to respond differently to electrical signals of different amplitudes, since the displacement of the free end of the element tends to be proportional to the amplitude of the applied voltage, and also that the converse electro-mechanical response may be utilized, whereby motion of the free end of the element causes a voltage to appear across the terminals 49 and 51.

Referring now to the alternative transducer of the voltage-operated relay type illustrated in plan and elevation by Figs. 5 and 6, the transducer shown comprises an elongated element 81 coiled into a generally spiral configuration occupying a generally circular or disk-shaped space the diameter of which is a small fraction of the length measured spirally along the elongated element. The coiled element again may have either of the bending-sensitive cross-sectional configurations illustrated in Figs. 2 and 3. The outer end portion of the spiral element 81 passes through a bracket 82 adjustably fastened by means of screws to a fixed post 83. The bracket 82 is adjusted so as barely to touch the sides of the element 81. The bracket then is tightened on the post 83, and cement is inserted between the contiguous surfaces of the element and of the bracket and post. The free inner end portion of the spiral element lies between the arms of a yoke structure 84, which is a part of a contactor arm 86, and is cemented to the yoke 84. The arm 86 is affixed to a rotatable shaft 87 riding in a thrust bearing 88. The remote end of the arm 86 is twisted to accommodate a movable contactor 91, which is electrically insulated from the arm.

Electrical excitation of the electrodes on the exposed faces of the spiral element is accomplished by applying a suitable voltage across the terminals 49 and 51, whence the exciting potential is conveyed through conductors 47 and 48 respectively to the inner and outer electrodes respectively on the element 81, similarly to the Fig. 1 arrangement. These electrodes are provided as illustrated in the cross-sectional view of Fig. 2 or 3, but are omitted in Figs. 5 and 6 for simplicity of illustration. When the polarity of the exciting voltage is such as to cause the element to bend so as to increase the radius of curvature of each portion of the spiral, the turns of the spiral as viewed in Fig. 5 tend not only to increase in diameter but also to rotate in a counter-clockwise direction. This results in a counter-clockwise rotation of the shaft 87 and causes the movable contactor 91 to move into contact with a fixed contactor 92 mounted on an insulating post 93. The relay circuit is completed through lead wires 33, 34 and terminals 36, 37, as in the Fig. 1 arrangement.

In a manner analogous to the operation of the helical element of the Fig. 1 arrangement the motion of each turn of the spiral element 81 is added to the motion of the next turn, resulting in a net displacement of the free end of the element much greater than the displacement of a single turn or portion of a turn. When the largest dimension of the transducer primarily determines its usefulness, as is frequently the case, the electro-mechanical response of the spiral element should be compared with the response of a straight element having a length equal to the largest dimension of the spiral element, this dimension being the diameter of the generally circular space occupied by the spiral. The coiled configuration again provides a significantly greater response for the spiral.

Figs. 7 and 8 illustrate in plan and sectional views a transducer including an elongated element 100 of electro-mechanically sensitive dielectric material which, although not coiled as are the helical and spiral elements of the embodiments of Figs. 1-3 and Figs. 5-6 respectively, is convoluted in another manner into a space the largest dimension of which is a small fraction of the total length of the element. The element 100 may be cut from a plate or block of any of the electro-mechanically sensitive materials referred to hereinabove which is expansion-sensitive, that is, which exhibits a longitudinal expansion or contraction under the influence of a lateral field. The element 100, in the form illustrated in Figs. 7 and 8, comprises a series of seven relatively straight legs, indicated consecutively 101-107 in the drawing. The bottom portions of legs 101 and 102 are connected together, the top portions of legs 102 and 103 are connected together, the bottom portions of legs 103 and 104 are connected together, etc., forming a convoluted structure made up of the straight legs joined together progressively at alternate ends thereof by portions curved through approximately 180 degrees and made of the same dielectric material of which the legs themselves are made.

Conductive electrodes are placed adjacent each side of each leg of the element 100, that is, on the opposed surfaces of adjoining legs and on the outer surfaces of the first and last legs 101 and 107. A suitable material for these electrodes is a conductive bonded graphitic composition which may be applied to the dielectric material in very thin layers. Such electrodes, in fact, may be used in the arrangements of the other figures. Although the electrodes ordinarily would be too thin to appear in the view of Fig. 7, the thickness of the electrodes is exaggerated in this view for purposes of illustration; to prevent complication of the drawings the electrodes are not separately distinguishable in the Fig. 8 view. Referring to Fig. 7, electrodes numbered 111, 112, 113, 114, and 115 are placed respectively on the left and right side of leg 101, the left and right sides of leg 102, and the left side of leg 103. Similar electrodes appear on the remaining sides of the several legs. The electrodes are connected in the following manner. The end electrode 111, the electrodes 114 and 115 between the legs 102 and 103, and the electrodes between the legs 104 and 105 and between the legs 106 and 107 are interconnected and brought out to an excitation terminal 49. The remaining electrodes, including the electrodes 112 and 113 between the legs 101 and 102 and the end electrode on the leg 107, are interconnected and brought out to the other excitation terminal 51. In this way alternate legs of the element 100 may be excited in opposite polarities at a given time. The start or upper end of the first leg 101 is cemented within a yoke 117 which is part of a fixed bracket, while the end or bottom of the last leg 107 is cemented within a yoke 118 carrying a movable contactor 119.

Application of an excitation potential of the proper polarity across the terminals 49 and 51 causes a field to be applied across the leg 101 through electrodes 111 and 112, resulting in the longitudinal expansion of that leg and a downward displacement of the bottom portion common to the legs 101 and 102. However, the leg 102 is excited through electrodes 113 and 114 by an electrical field of the opposite polarity, so that the top portion common to legs 102 and 103 is displaced downwardly not only by the amount of the downward displacement of the bottom of leg 102 but also by an approximately equal additional amount due to the contraction of the leg 102. Leg 103 again is excited to produce an expansion, so that the bottom portion common to legs 103 and 104 moves downwardly about three times as far as the bottom portion common to the legs 101 and 102. In this manner the bottom and top portions of each successive leg receive accumulatively greater downward displacements. Therefore, the bottom end of the last leg 107 imparts a displacement to the movable contactor 119 significantly greater than the displacement of the bottom of the first leg 101, although the first leg has a length nearly equal to the largest dimension of the convoluted transducer element.

The downward displacement of the contactor 119 moves it into contact with a fixed contactor 120. As in the arrangements of the previous figures, the movable and fixed contactors 119 and 120 are provided with respective lead wires 33 and 34 connected to terminals 36 and 37 respectively to provide the conventional relay connections. To support and guide the element 100, two comb-shaped members 122 and 123 are mounted in fixed positions near the top and bottom respectively of the convoluted element as viewed in Fig. 7. The areas between the teeth of the comb may be lined with a resilient fabric to receive and support the legs of the element with a minimum of opposition to the expansive motions thereof tending to close and open the relay contacts.

The convoluted elements of the several embodiments of the invention described and illustrated hereinabove may be formed of any suitable electro-mechanically sensitive dielectric materials in any convenient manner. Of course, the proportions, dimensions, and number of convolutions of the elements may be varied to suit individual requirements. Accordingly, the various parts of the arrangements illustrated in the drawings may be made to a larger or smaller scale, as desired, and additional convolutions may be added to obtain still greater mechanical responses. The following are suggested merely as examples of various possible methods of manufacturing the convoluted elements. The helical element of Figs. 1 and 2 may be made by forming two hollow cylinders of titanate material with the outer diameter of one cylinder equal to the inner diameter of the other. The outer surface of the smaller cylinder and the inner surface of the larger cylinder are coated with a cementing substance and the smaller cylinder is slipped within the larger cylinder. After the cement has hardened, helical slots are machined in the composite cylinder, leaving a helical element having the cross-sectional shape illustrated in Fig. 2. To obtain the cross-sectional shape illustrated in Fig. 3, a layer of raw titanate material may be deposited from suspension onto a flat form bent into a spiral or helical configuration, and the resulting shape may be fired at ceramic-firing temperatures to form the helical tubular element with vaporization of the material of the form, in accordance with the method disclosed and claimed in the copending application Serial No. 32,588, filed June 12, 1948, in the name of Charles K. Gravley and assigned to the same assignee as the present invention. A hollow element having the spiral configuration illustrated in Figs. 5 and 6 also may be formed by the method of the last-mentioned copending application. A block of any expansion-sensitive electro-mechanically sensitive material may be used to fabricate the convoluted element illustrated in Figs. 7 and 8, the grooves separating the adjacent pairs of legs of the element being cut out by means of a diamond saw.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electro-mechanical transducer comprising: an elongated element of electro-mechanically sensitive dielectric material convoluted into a space the largest dimension of which is a small fraction of the length measured along said elongated element to provide an electro-mechanical response significantly greater than that of an element of the same material and cross-sectional shape having a length equal to said largest dimension but having a straight configuration.

2. An electro-mechanical transducer comprising: an elongated element of electro-mechanically sensitive dielectric material coiled into a space the largest dimension of which is a small fraction of the length measured along said elongated element to provide an electro-mechanical response significantly greater than that of an element of the same material and cross-sectional shape having a length equal to said largest dimension but having a straight configuration.

3. An electro-mechanical transducer comprising: an elongated element of electro-mechanically sensitive dielectric material coiled into a generally helical configuration occupying a generally cylindrical space the largest dimension of which is a small fraction of the length measured helically along said elongated element to provide an electro-mechanical response significantly greater than that of an element of the same material and cross-sectional shape having a length equal to said largest dimension but having a straight configuration.

4. An electro-mechanical transducer comprising: an elongated element of electro-mechanically sensitive dielectric material coiled into a generally spiral configuration occupying a generally circular space the diameter of which is a small fraction of the length measured spirally along said elongated element to provide an electro-mechanical response significantly greater than that of an element of the same material and cross-sectional shape having a length equal to said diameter but having a straight configuration.

5. An electro-mechanical transducer comprising: an elongated bending-sensitive element of electro-mechanically sensitive dielectric material coiled into a space the largest dimension of which is a small fraction of the length measured along said elongated element to provide an electro-mechanical response, involving bending of said bending-sensitive coiled element and associated changes in the radius of curvature of said coiled element, of a magnitude significantly greater than the magnitude of the electro-mechanical response of an element of the same material and cross-sectional shape having a length equal to said largest dimension but having a straight configuration.

6. An electro-mechanical transducer comprising: an elongated hollow element of electro-mechanically sensitive polycrystalline dielectric material, having an internal electrode and two peripherally separated longitudinally extending exposed electrodes, and coiled into a space the largest dimension of which is a small fraction of the length measured along said elongated element to provide an electro-mechanical response significantly greater than that of an element of the same material and cross-sectional shape having a length equal to said largest dimension but having a straight configuration.

7. An electro-mechanical transducer comprising: an elongated composite element of electro-mechanically sensitive polycrystalline dielectric material, having two longitudinally extending strips cemented together along longitudinally extending electroded surfaces thereof, and coiled into a space the largest dimension of which is a small fraction of the length measured along said elongated element to provide an electro-mechanical response significantly greater than that of an element of the same material and cross-sectional shape having a length equal to said largest dimension but having a straight configuration.

8. An electro-mechanical transducer comprising: an elongated expansion-sensitive element of electro-mechanically sensitive dielectric material convoluted into a space the largest dimension of which is a small fraction of the length measured along said elongated element to provide an electro-mechanical response significantly greater than that of an element of the same material and cross-sectional shape having a length equal to said largest dimension but having a straight configuration.

9. An electro-mechanical transducer comprising: an elongated expansion-sensitive element of electro-mechanically sensitive dielectric material convoluted into a series of relatively straight legs joined progressively at alternate ends thereof by portions curved through approximately 180 degrees and occupying a space the largest dimension of which is a small fraction of the length measured along said elongated element to provide an electro-mechanical response significantly greater than that of an element of the same material and cross-sectional shape having a length equal to said largest dimension but having a straight configuration.

10. An electro-mechanical transducer comprising: an elongated element of electro-mechanically sensitive polycrystalline dielectric material convoluted into a space the largest dimension of which is a small fraction of the length measured along said elongated element to provide an electro-mechanical response significantly greater than that of an element of the same material and cross-sectional shape having a length equal to said largest dimension but having a straight configuration.

11. An electro-mechanical transducer comprising: an elongated element of electro-mechanically sensitive polycrystalline titanate dielectric material convoluted into a space the largest dimension of which is a small fraction of the length measured along said elongated element to provide an electro-mechanical response significantly greater than that of an element of the same material and cross-sectional shape having a length equal to said largest dimension but having a straight configuration.

12. An electro-mechanical transducer comprising: an elongated element of electro-mechanically sensitive polycrystalline barium titanate material convoluted into a space the largest dimension of which is a small fraction of the length measured along said elongated element to provide an electro-mechanical response significantly greater than that of an element of the same material and cross-sectional shape having a length equal to said largest dimension but having a straight configuration.

13. An electro-mechanical transducer comprising: an elongated element consisting primarily of polycrystalline barium titanate and convoluted into a space the largest dimension of which is a small fraction of the length measured along said elongated element to provide an electro-mechanical response significantly greater than that of an element of the same material and cross-sectional shape having a length equal to said largest dimension but having a straight configuration.

14. A voltage-operated relay comprising: an electro-mechanical transducer including an elongated element of electro-mechanically sensitive dielectric material convoluted into a space the largest dimension of which is a small fraction of the length measured along said elongated element to provide a mechanical response for a given excitation voltage significantly greater than that of an element of the same material and cross-sectional shape having a length equal to said largest dimension but having a straight configuration; means for mounting one end portion of said convoluted elongated element; a movable contactor affixed to the other end portion of said element and adapted to occupy two positions, one position when said transducer is supplied with an excitation voltage and another position when said transducer is electrically unexcited; and a normally fixed contactor adapted to be in electrical contact with said movable contactor when said movable contactor occupies one of said two positions.

ALFRED L. W. WILLIAMS.

No references cited.